United States Patent
Hammer et al.

[11] Patent Number: 5,662,971
[45] Date of Patent: Sep. 2, 1997

[54] CELLULOSE-BASED FOOD CASING HAVING IMPROVED RIPENING PROPERTIES

[75] Inventors: Klaus-Dieter Hammer, Mainz; Manfred Siebrecht; Theo Krams, both of Wiesbaden, all of Germany

[73] Assignee: Hoechst Aktiengesellschaft, Frankfurt am Main, Germany

[21] Appl. No.: 288,268

[22] Filed: Aug. 11, 1994

[30] Foreign Application Priority Data

Aug. 12, 1993 [DE] Germany .................. 43 27 020.4

[51] Int. Cl.$^6$ ...................................... A22C 13/00
[52] U.S. Cl. .................. 428/34.8; 138/118.1; 452/35; 206/802; 426/105; 426/129
[58] Field of Search ............... 428/34.8; 138/118.1; 452/35; 206/802; 426/105, 272, 129; 229/DIG. 10

[56] References Cited

U.S. PATENT DOCUMENTS

| | | | |
|---|---|---|---|
| 3,447,939 | 6/1969 | Dee Lynn Johnson | 106/135 |
| 3,508,941 | 4/1970 | Dee Lynn Johnson | 106/125 |
| 3,674,523 | 7/1972 | Rose et al. | 106/168 |
| 3,937,672 | 2/1976 | Busch et al. | 260/17.3 |
| 4,002,712 | 1/1977 | Hammer et al. | 264/194 |
| 4,198,325 | 4/1980 | Hammer et al. | 260/17.3 |
| 4,253,879 | 3/1981 | Hammer et al. | 106/165 |
| 5,096,754 | 3/1992 | Hammer et al. | 428/34.8 |

FOREIGN PATENT DOCUMENTS

| | | |
|---|---|---|
| 0 502 432 | 9/1992 | European Pat. Off. |
| 34 09 746 | 6/1985 | Germany |
| 40 02 083 | 8/1991 | Germany |

*Primary Examiner*—Charles Nold
*Attorney, Agent, or Firm*—Foley & Lardner

[57] ABSTRACT

A fiber-reinforced cellulose-based food casing which comprises alginic acid and/or alginate, and fats, fat-like compounds, and/or oils and a non-reinforced cellulose-based food casing which comprises a copolymer containing 80 to 20 mol % of units of the formula I and 20 to 80 mol % of units of the formula II or III

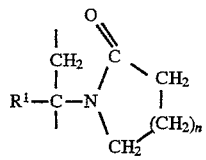 (I)

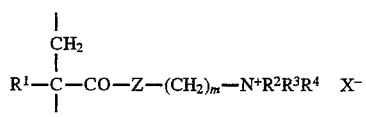

(II)

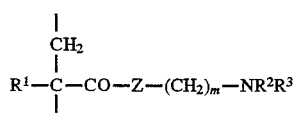

(III)

in which $R^1$ to $R^4$ are identical or different and are hydrogen or $(C_1-C_6)$alkyl, Z is O or N—$R^5$, $R^5$ is hydrogen or $(C_1-C_6)$alkyl, $X^-$ is $Cl^-$, $Br^-$, $I^-$, $(C_1-C_6)$alkyl-$SO_2$—$O^-$, $(C_1-C_6)$alkyl-$O$—$SO_2$—$O^-$, $HSO_4^-$ or ½ $SO_4^{2-}$, n is an integer from 1 to 3 and m is an integer from 2 to 6, and fats, fat-like compounds, and/or oils useful as casings for sausages.

20 Claims, No Drawings

CELLULOSE-BASED FOOD CASING HAVING IMPROVED RIPENING PROPERTIES

BACKGROUND OF THE INVENTION

The present invention relates to a cellulose hydrate-based food casing and its use as a sausage casing.

Flat, in particular web-like and sheet-like, and tubular cellulose hydrate-based food casings are conventionally manufactured by the viscose process. In the viscose process, an alkaline cellulose xanthogenate solution termed a "viscose solution" is extruded through a ring or slot-shaped die, coagulated in acid solution as cellulose hydrate gel and regenerated to form cellulose hydrate.

By changing the viscose composition and incorporating additives, the properties of the food casing can be varied. These modifications can be performed both on reinforced and also on unreinforced casings. Unreinforced cellulose hydrate casings are termed transparent cellulose films and are known as Cellophane®. Fiber-reinforced food casings are obtained by coating one or both sides of a web-like or tubular fiber framework with a viscose solution, impregnating it and then treating with a coagulation solution and regeneration solution. Such casings are particularly used for naturally-ripened and mold-ripened long-keeping sausage.

Food casings fulfill important functions in the manufacture, ripening and storage of sausage. They must be supple, sufficiently extensible and storable for long periods.

The suppleness and processability of casings are conventionally improved by secondary softeners, such as glycerol, glycol, or polyglycol. The secondary softeners are not covalently bound to the cellulose hydrate, but are only bound by intermolecular forces. When the casing is soaked in water prior to filling or when the sausage is scalded or cooked, the secondary softeners are virtually completely dissolved out. This causes shrinkage, compaction, and embrittlement of the casing after drying the sausage. Owing to the shrinkage, the internal pressure of the sausage can increase so much that it bursts. These phenomena are due to a crystallization of the cellulose hydrate.

In order to decrease the crystallization tendency, so-called "primary" softeners, which effect a permanent softening, are added to the viscose solution. The primary softeners used are compounds which react with the cellulose molecules, such as $N$-$(C_9$-$C_{24})$-alkyl-$N,N',N'$-tris(hydroxymethyl)urea or similar compounds that have long aliphatic carbon chains. See U.S. Pat. No. 4,002,712. However, unreactive compounds, such as di-and polyhydroxy compounds which are esterified with long-chain aliphatic monocarboxylic acids (See DE-A 26 54 427 equivalent to U.S. Pat. No. 4,253,879), or alkylene oxide-based polymers having at least one N-hydroxymethyl-carbamate group (See DE-A 26 54 417 equivalent to U.S. Pat. No. 4,198,325) are also used.

However, the water permeability of the sausage casings is barely influenced by these softening methods. As low a water permeability as possible of the cellulose casings is important for the ripening behavior and mold growth in the case of naturally-ripened and mold-ripened, long-keeping sausage. The even ripening of long-keeping sausage demands slow release of water through the casing during the first days.

Fiber-reinforced cellulose casings exhibit a high water permeability of generally about 90 to 110 l of water per square meter of casing in 24 hours at a pressure of 40 bar. Sausages manufactured with these casings are therefore ripened in ripening chambers in which a uniformly high relative air humidity can be maintained. Insufficient or varying air humidity leads to so-called dry edges on the sausage. The reason is excessively rapid drying out of the sausage filling surface in the first days of ripening. The dry edge decreases further water loss, so that the interior of the sausage is still moist even after the conventional ripening time.

In order to decrease the water permeability, attempts have been made to compact the cellulose hydrate casing, for example, by repeated drying of the casings or by the inclusion of cross-linking agents, such as cyclic ureamethylol. See DE-A 22 46 829 equivalent to U.S. Pat. No. 3,937,672.

Collagen casings, i.e., casings made of cured protein, have the desired swelling index and the low water permeability which is generally only about 10 l of water per square meter in 24 hours at a pressure of 40 bar. However, mechanical strength, toughness and caliber constancy which are essential criteria for the quality of sausage casings leave much to be desired in collagen casings.

A further quality characteristic of cellulose hydrate casings is their moisture balance. Thus, the casings should be able to absorb as much water as possible, i.e., have a high swelling index. To determine this swelling index, the casing is softened in water and adhering water is centrifuged off at a defined speed of rotation. After weighing, the casing material is completely dried and again weighed. The weight difference, expressed in percent of the weight of the dry casing gives the swelling index. A swelling index of 120% therefore means that a casing of 100 g dry weight absorbs 120 g of water. The casings should release the water again only slowly.

The water permeability gives no indication of the amount of water which can be absorbed or released. The permeation is solely a measure of the water permeability of the casing, whereas the moisture balance characterizes the water absorption and water retention capacity. A good moisture balance ensures a problem-free drying process in which no embrittlement or overdrying of the casing occurs.

By the addition of alginic acid or salts thereof to the viscose solution, a permanently softened sausage casing having an improved swelling index can be obtained. See DE-A 40 02 083. These sausage casings manage even without glycerol as a secondary softener. Alginic acid or alginate loosens up the structure of the cellulose hydrate, therefore the degree of compaction of the glycerol-free cellulose hydrate is highest with lower alginic acid or alginate concentration, the minimum concentration being 5% by weight, based on the weight of the cellulose. However, these casings are paper-like and wrinkle in the dry state or at low moisture contents. This disadvantage can be diminished by increasing the alginic acid/alginate concentration. However, in this case the permeation increases, which leads to impaired ripening properties of the sausages.

SUMMARY OF THE INVENTION

An object of the present invention is therefore to provide food casings with the positive, desired properties of both cellulose hydrate casings and collagen casings. The casings therefore should let through as little water as possible and should be easily processable even at low moisture contents by remaining tough and supple, but should lose the paper-like wrinkling character in the dry state.

It is also an object of the present invention to provide methods of making such casing and methods of using such casings, for example, as sausage casings.

In accordance with these and other objects, there has been provided, in accordance with a first aspect of the present invention, a fiber-reinforced cellulose-based food casing which comprises (a) 3 to 25% by weight based on the weight of cellulose of at least one first component selected from the group consisting of alginic acid and alginates, and (b) 1 to 20% by weight based on the weight of cellulose of at least one second component selected from the group consisting of fats, fat-like compounds, and oils.

In accordance with another aspect of the present invention there has been provided a non-reinforced cellulose-based food casing which comprises (a) 0.5 to 15% by weight based on the weight of cellulose of a copolymer containing 80 to 20 mol % of units of the formula I and 20 to 80 mol % of units of the formula II or III

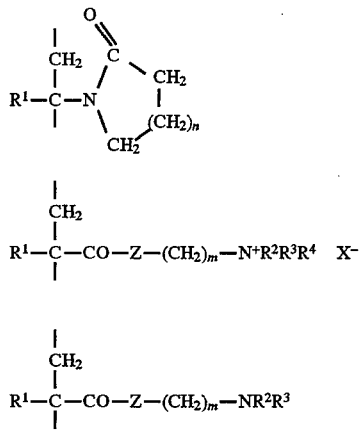

in which
$R^1$ to $R^4$ are identical or different and are hydrogen or $(C_1-C_6)$alkyl,
Z is O or N—$R^5$,
$R^5$ is hydrogen or $(C_1-C_6)$alkyl,
$X^-$ is $Cl^-$, $Br^-$, $I^-$, $(C_1-C_6)$alkyl-$SO_2$—$O^-$, $(C_1-C_6)$alkyl-O—$SO_2$—$O^-$, $HSO_4^-$ or ½ $SO_4^{2-}$,
n is an integer from 1 to 3 and
m is an integer from 2 to 6, and (b) 1 to 20% by weight based on the weight of cellulose of at least one second component selected from the group consisting of fats, fat-like compounds, and oils.

In accordance with other aspects of the present invention there has been provided sausage encased with either of these casings.

Further objects, features, and advantages of the present invention will become apparent from the detailed description of preferred embodiments which follows.

DETAILED DESCRIPTION OF PREFERRED EMBODIMENTS

Any type of oil, fat, and/or fat-like substance or combination thereof can be used in the fiber-reinforced or non-reinforced food casings of the present invention. The total amount of such substances is from 1 to 20% by weight based on the weight of cellulose in the casing. Generally, the term "oils" includes all types of oils, especially vegetable oils, such as olive oil and rapeseed oil. Animal oils are less suitable. "Fat-like compounds" includes substances having the characteristics of fat, including salts of fatty acids, such as calcium stearate and calcium oleate, fatty amines, fatty alcohols and ethoxylates thereof, and related compounds. The fat may be any type of fat known, especially a natural fat which predominantly consists of mono-, di- and/or triglycerides obtained from glycerine and fatty acids. Such fats are found, e.g., in meat or in nuts.

The fat, oil, and/or fat-like substances are incorporated into the cellulose hydrate matrix and are believed to affect a compaction of the surface of the cellulose hydrate casing by delaying the regeneration in the precipitation bath. As a result, the water permeability (permeation) is decreased. At the same time, the substances have a softening action. The total content of these compounds is preferably 2 to 12% by weight, based on the weight of the cellulose.

Particularly supple and tough fiber casings are obtained if the fiber-reinforced casing additionally contains 0.5 to 15%, by weight, based on the weight of the cellulose, of a copolymer having 80 to 20 mol % of units of the formula I and 20 to 80 mol % of units of the formula II or III.

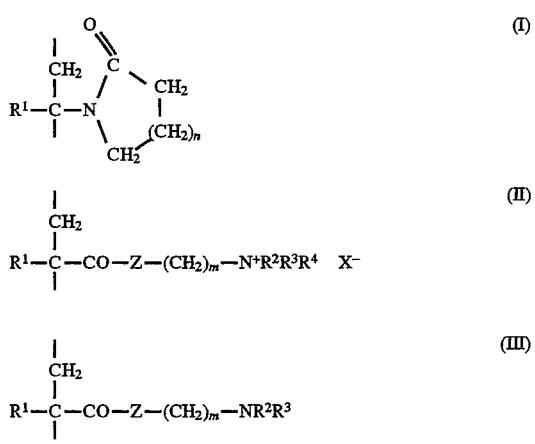

in which
Rhu 1to $R^4$ are identical or different and are hydrogen or $(C_1-C_6)$alkyl,
Z is O or N—$R^5$, in which
$R^5$ is hydrogen or $(C_1-C_6)$alkyl,
$X^-$ is $Cl^-$, $Br^-$, $I^-$, $(C_1-C_6)$alkyl-$SO_2$—$O^-$, $(C_1-C_6)$alkyl-O—$SO_2$—$O^-$, $HSO_4^-$ or ½ $SO_4^{2-}$,
n is an integer from 1 to 3 and
m is an integer from 2 to 6.

It is to be understood that the individual units of the copolymer can have different R, Z, m, n and X values. The total number of units encompassed by formula (I) is 20 to 80 mol % while the total number of units encompassed by formula (II) and formula (III) is 20 to 80 mol %. The percentages are based on the total units in the copolymer. Preferably, the molecular weight $M_w$ of the copolymer is in the range of from 800,000 to 1,000,000.

Copolymers containing quaternary ammonium groups are preferred, i.e., copolymers containing units of the formulae I and II. Of these, those are preferred in which n=1, m=2, Z=O, $R^1$ to $R^3$=$CH_3$, $R^4$=$C_2H_5$ and $X^-$=$C_2H_5$—O—$SO_2$—$O^-$, i.e., copolymers of N-vinylpyrrolidone and ethyl (2-methacryloyloxyethyl) dimethylammonium ethylsulfate. The copolymers are preferably contained in the reinforced and unreinforced food casing in a proportion of 1 to 5% by weight, based on the weight of the cellulose.

The casings of the present invention are generally suppler and tougher and less water-permeable, the greater the quantity of the additives incorporated in the cellulose matrix. This was surprising, since it was known that the permeation of cellulose hydrate casings which are modified solely with alginic acid/alginate increases with increased amounts of alginic acid or alginate.

Surprisingly, even in the case of non-fiber-reinforced cellulose-based food casings, a decisive improvement of the mechanical properties can be achieved by addition of 0.5 to 15% of the copolymer described above. Generally a low proportion, for example, 0.5 to 5% by weight, of the above-mentioned copolymer is useful. This copolymer mixes completely homogeneously with the cellulose material, although the molecular weight $M_w$ of the copolymer can be of about 1,000,000 which is about 10 times as high as that of the cellulose.

The non-fiber-reinforced casings further contain 1 to 20% by weight, preferably 2 to 12% of fats, fat-like compounds, and/or oils. Alginic acid or alginate also may be added if desired or required. The amounts and types of copolymers, fats, fat-like compounds, oils, alginates and alginic acid may be the same in the unreinforced casing as in the reinforced casing.

The alginic acid and the alginates serve to improve the mechanical stability, in particular the dimensional stability, of the casings. Furthermore, they exhibit plastifying properties.

The fiber-reinforced and non-fiber-reinforced food casings according to the invention which are used, in particular, as sausage casings, can be very easily fabricated and processed even without secondary softeners. However, when a low proportion of the copolymer used, such as 0.5 to 1.5% by weight, an addition of about 10 to 11% by weight of glycerol, based on the weight of the cellulose, is advantageous. Compared with the content of 20 to 22% by weight conventional hitherto, this represents a halving of the usual amount of glycerol added.

Fiber-reinforced cellulose-based food casings which are modified with 5% by weight of alginate and 6% by weight of calcium stearate, based on the weight of the cellulose in each case, exhibit a permeation of 55 to 60 $l/m^2 \cdot d$ at 40 bar pressure. If the cellulose is modified with 7.5% by weight of alginate and 8% by weight of calcium stearate, the value is still 50 to 55 $l/m^2 \cdot d$. If 2% by weight of a copolymer of N-vinylpyrrolidone and ethyl(2-methacryloyloxyethyl) dimethylammonium ethyl-sulfate is further added to the 7.5% by weight of alginate and the 8% by weight of calcium stearate, the permeation thus decreases to 40 to 50 $l/m^2 \cdot d$. In this case the casing approximates very closely the ripening properties of collagen casings. The mold grows comparatively slowly and densely as in collagen casings. Dry edges are not formed so that adhesion and peelability of the casing are not impaired. Even after ripening of the sausages, the casing is still "collagen-like".

The food casings according to the invention can be manufactured in any desired manner such as by simple addition of the additives to the viscose solution and subsequent extrusion from a ring or slot-shaped die as already described in the introduction. Fiber-reinforced casings can be obtained from a fiber material which is coated on one or both sides with the viscose solution.

EXAMPLE 1

A 17 g hemp fiber paper was formed into a tube having a diameter of 55 mm (caliber 55) and coated inside and out with a mixture of
197 l/h of viscose and
28.8 l/h of a solution of
  23 l of a 4% strength aqueous alginate solution and
  2 l of a 50% strength aqueous calcium stearate dispersion (Lubranil® CA)

Based on the weight of the cellulose, the content of alginate is 7.5% by weight and the content of calcium stearate is 6.0% by weight. The tube was then passed through conventional spinning, precipitation and wash vats. Before entry into the dryer, the gel tube was treated with a conventional impregnation solution, inflated with air to the intended diameter and dried to a residual moisture of 12 to 14% by weight.

The weight of the finished sausage casing was 80.6 $g/m^2$, the swelling index 137% and the permeation 55 $l/m^2 \cdot d$.

The fiber-reinforced cellulose casing was shirred and then filled with a long-keeping sausage filling by an automatic apparatus. Course of ripening and mold growth were normal, dry edges did not form. The peelability was likewise normal.

EXAMPLE 2

A 17 g hemp fiber paper was formed into a tube of caliber 55 and coated inside and out with a mixture of
197 l/h of viscose and
19 l/h of a solution of
  23.2 l of a 4% strength aqueous alginate solution,
  2.6 l of a 50% strength aqueous calcium stearate solution and
  4.26 l of a 10% strength aqueous solution of a copolymer of N-vinylpyrrolidone and ethyl-(2-methacryloyloxyethyl)dimethylammonium ethylsulfate. $M_w \approx 1,000,000$ (Gafquat® 755N)
based on the weight of the cellulose, the proportion of alginate is 5% by weight, that of calcium stearate is 6% by weight and that of the copolymer is 2% by weight.

The tube was then further processed as described in Example 1.

The weight of the finished material was 78 $g/m^2$, the swelling index was 142% and the permeation was 40 $l/m^2 \cdot d$.

No difference to collagen casings was shown in the course of ripening and mold growth. Even under unfavorable conditions, no dry edge was formed. The peelability was normal.

EXAMPLE 3

A 17 g hemp fiber paper was formed into a tube of caliber 55 and coated inside and out with a mixture of
197 l/h of viscose and
19 l/h of a solution of
  41.1 l of a 4% strength aqueous alginate solution and
  3.9 l of a 50% strength aqueous calcium stearate solution,
so that the content of alginate was 5% by weight, that of calcium stearate was 8% by weight, based on the weight of the cellulose in each case. It is then further processed as described in Example 1.

The finished food casing had a weight of 82 $g/m^2$, the swelling index was 136% and the permeation was 48 $l/m^2 \cdot d$.

Course of ripening, mold growth and peelability were normal and were roughly equivalent to those of collagen casings. Dry edges did not form.

EXAMPLE 4

A 17 g hemp fiber paper was formed into a tube having a diameter of 60 mm (=caliber 60) and coated inside and out with a mixture of
211 l/h of viscose and
21 l/h of a solution of
  20.00 l of a 4% strength aqueous alginate solution,
  1.12 l of a 50% strength aqueous calcium stearate dispersion and 0.28 l of olive oil, so that the content of alginate was 5% by weight, the content of calcium stearate was 3% by weight and the content of olive oil was 1.3% by weight. The tube was then further processed as described in Example 1.

The weight of the food casing was 80 g/m², the swelling index was 128% and the permeation was 58 l/m²·d The casings could be filled without problem; course of ripening and peelability were normal.

What is claimed is:

1. A fiber-reinforced cellulose food casing which has a cellulose matrix and which comprises mixed in the cellulose matrix (a) 3 to 25% by weight based on the weight of cellulose in the casing of at least one first component selected from the group consisting of alginic acid and alginates, and (b) 1 to 20% by weight based on the weight of cellulose in the casing of at least one second component selected from the group consisting of fats, compounds selected from one or more of the group consisting of salts of fatty acids, fatty amines, fatty alcohols, and ethoxylates of fatty alcohols, and oils.

2. A fiber-reinforced food casing as claimed in claim 1, wherein the second component comprises 1 to 20% by weight based on the weight of cellulose of facts.

3. A fiber-reinforced food casing as claimed in claim 1, wherein the second component comprises 1 to 20% by weight of the weight of cellulose of said compounds.

4. A fiber-reinforced food casing as claimed in claim 1, wherein the second component comprises 1 to 20% by weight of the weight of cellulose of oils.

5. A fiber-reinforced food casing as claimed in claim 4, wherein the oils are vegetable oils.

6. A fiber-reinforced food casing as claimed in claim 3, wherein the compounds are selected from one or more of the group consisting of calcium stearate and calcium oleate.

7. A fiber-reinforced food casing as claimed in claim 5, wherein the vegetable oils are selected from one or more of the group consisting of olive oil and rapeseed oil.

8. A fiber-reinforced food casing as claimed in claim 1, wherein the content of the second component is 2 to 12% by weight based on the weight of the cellulose.

9. A fiber-reinforced food casing as claimed in claim 1, wherein the casing in the cellulose matrix additionally comprises 0.5 to 15% by weight based on the weight of the cellulose in the casing of a copolymer containing 80 to 20 mol % of units of the formula I and 20 to 80 mol % of units of the formula II or III

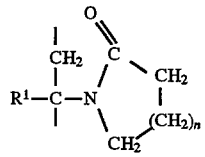

(I)

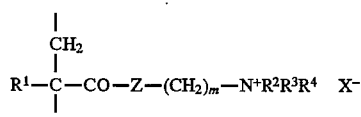

(II)

(III)

in which $R^1$ to $R^4$ are identical or different and are hydrogen or $(C_1-C_6)$alkyl, Z is O or N—$R^5$, $R^5$ is hydrogen or $(C_1-C_6)$alkyl, $X^-$ hu – is $Cl^-$, $Br^-$, $I^-$, $(C_1-C_6)$alkyl-$SO_2$—$O^-$, $(C_1-C_6)$alkyl-O—$SO_2$—$O^-$, $HSO_4^-$ or ½ $SO_4^{2-}$, n is an integer from 1 to 3 and m is an integer from 2 to 6.

10. A fiber-reinforced food casing as claimed in claim 9, wherein the copolymer is a quaternized copolymer comprising units of the formulae I and II.

11. A fiber-reinforced food casing as claimed in claim 10, wherein n=1, m=2, Z=O, $R^1$ to $R^3$=$CH_3$, $R^4$=$C_2H_5$, and $X^-$=$C_2H_5$—O—$SO_2$—$O^-$.

12. A fiber reinforced casing as claimed in claim 1, which further comprises glycerol.

13. A non-reinforced cellulose-based food casing which has a cellulose matrix and which comprises mixed in the cellulose matrix (a) 0.5 to 15% by weight based on the weight of cellulose in the casing of a copolymer containing 80 to 20 mol % of units of the formula I and 20 to 80 mol % of units selected from one or both units of the formula II or III

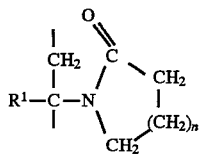

(I)

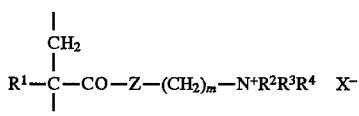

(II)

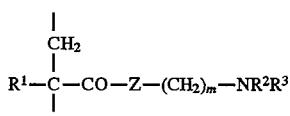

(III)

in which $R^1$ to $R^4$ are identical or different and are hydrogen or $(C_1-C_6)$alkyl, Z is O or N—$R^5$, $R^5$ is hydrogen or $(C_1-C_6)$alkyl, $X^-$ hu – is $Cl^-$, $Br^-$, $I^-$, $(C_1-C_6)$alkyl-$SO_2$—$O^-$, $HSO_4^-$ or ½ $SO_4^{2-}$, n is an integer from 1 to 3 and m is an integer from 2 to 6, and (b) 1 to 20% by weight based on the weight of cellulose in the casing of at least one second component selected from the group consisting of fats, compounds selected from one or more of the group consisting of salts of fatty acids, fatty amines, fatty alcohols, and ethoxylates of fatty alcohols, and oils.

14. A non-fiber-reinforced food casing as claimed in claim 13, wherein the casing in the cellulose matrix additionally comprises 3 to 25% by weight of at least one of alginic acid and alginate, based on the weight of the cellulose in the casing.

15. A sausage casing comprising a casing as claimed in claim 1.

16. Sausage encased with a casing as claimed in claim 1.

17. A sausage casing comprising a casing as claimed in claim 13.

18. Sausage encased with a casing as claimed in claim 13.

19. A fiber-reinforced food casing as claimed in claim 1, which is formed from a viscose solution containing components (a) and (b).

20. A non-reinforced cellulose-based food casing as claimed in claim 13, which is formed from a viscose solution containing components (a) and (b).

* * * * *

UNITED STATES PATENT AND TRADEMARK OFFICE
CERTIFICATE OF CORRECTION

PATENT NO. : 5,662,971
DATED : September 2, 1997
INVENTOR(S) : Klaus-Dieter HAMMER It is certified that error appears in the above-identified patent and that said Letters Patent is hereby corrected as shown below:

Column 7, Claim 2, line 29, "facts" should read --fats--.

Column 8, Claim 9, line 13, "Xhu" should read --$X^-$--.

Column 8, Claim 13, line 57, "Xhu" should read --$X^-$--.

Column 8, Claim 11, lines 22 and 23, "n=1, m=2, Z=O, $R^1$ to $R^3$=$CH_3$, $R^4$=$C_2H_5$, and $X^-$=$C_2H_5$—O—$SO_2$—$O^-$" should read --n = 1, m = 2, Z = O, $R^1$ to $R^3$ = $CH_3$, $R^4$ = $C_2H_5$, and $X^-$ = $C_2H_5$—O—$SO_2$—$O^-$--.

Column 4, lines 56-58, "n=1, m=2, Z=O, $R^1$ to $R^3$=$CH_3$, $R^4$=$C_2H_5$ and $X^-$= $C_2H_5$—$SO_2$—$O^-$" should read --n = 1, m = 2, Z = O, $R^1$ to $R^3$ = $CH_3$, $R^4$ = $C_2H_5$ and $X^-$ = $C_2H_5$—$SO_2$—$O^-$--.

Signed and Sealed this

Twenty-eighth Day of April, 1998

Attest:

BRUCE LEHMAN

Attesting Officer

Commissioner of Patents and Trademarks